US008631689B2

(12) United States Patent
Eser (10) Patent No.: US 8,631,689 B2
(45) Date of Patent: Jan. 21, 2014

(54) METHOD AND DEVICE FOR THE FUNCTIONAL TESTING OF A PRESSURE SWITCH OF A TANK VENT SYSTEM FOR AN INTERNAL COMBUSTION ENGINE OF A MOTOR VEHICLE

(75) Inventor: Gerhard Eser, Hemau (DE)

(73) Assignee: Continental Automotive GmbH, Hannover (DE)

( * ) Notice: Subject to any disclaimer, the term of this patent is extended or adjusted under 35 U.S.C. 154(b) by 487 days.

(21) Appl. No.: 12/992,144

(22) PCT Filed: Apr. 17, 2009

(86) PCT No.: PCT/EP2009/054581
§ 371 (c)(1),
(2), (4) Date: Nov. 11, 2010

(87) PCT Pub. No.: WO2009/138310
PCT Pub. Date: Nov. 19, 2009

(65) Prior Publication Data
US 2011/0079298 A1    Apr. 7, 2011

(30) Foreign Application Priority Data
May 15, 2008   (DE) .......................... 10 2008 023 607

(51) Int. Cl.
*G01M 15/04*    (2006.01)
(52) U.S. Cl.
USPC ....................................................... 73/114.39
(58) Field of Classification Search
USPC ............... 73/114.31, 114.37, 114.38, 114.39, 73/114.43, 114.77
See application file for complete search history.

(56) References Cited

U.S. PATENT DOCUMENTS

| 5,263,462 | A | 11/1993 | Reddy ........................... 123/520 |
| 5,746,174 | A | 5/1998 | Abe et al. ...................... 123/306 |
| 6,550,316 | B1 * | 4/2003 | Wong et al. .................... 73/49.7 |
| 7,272,488 | B2 * | 9/2007 | Hayashi et al. ............... 701/114 |

(Continued)

FOREIGN PATENT DOCUMENTS

| DE | 102006045678 A1 | 4/2008 | ............. F02M 25/08 |
| WO | 2008037571 | 4/2008 | ............. F02B 77/08 |
| WO | 2008065103 | 6/2008 | ............. F02M 25/08 |
| WO | 2009138310 | 11/2009 | ............. F02M 25/08 |

OTHER PUBLICATIONS

Report on Examination, German patent application No. 102008023607.1-25, 2 pages, Mar. 3, 2009.

(Continued)

*Primary Examiner* — Eric S McCall
(74) *Attorney, Agent, or Firm* — King & Spalding L.L.P.

(57) ABSTRACT

A method for the functional testing of a pressure switch of a tank vent device for an internal combustion engine of a motor vehicle, enables the testing of the pressure switch even while the crankshaft is rotating. The pressure switch is located in a low pressure position if the pressure in the tank vent device is lower than a pressure threshold, and is otherwise in a high pressure position. In a rotating operating state of the crankshaft in which the pressure in an intake pipe exceeds the pressure threshold, a tank vent valve being disposed in a connecting line between a fuel vapor reservoir and the intake pipe is actuated such that the tank vent device and the intake pipe are pneumatically connected to each other. The pressure switch is assessed as defective if it is in the low pressure position after actuation of the tank vent valve.

20 Claims, 4 Drawing Sheets

(56) References Cited

U.S. PATENT DOCUMENTS

| | | | |
|---|---|---|---|
| 2001/0029771 A1 | 10/2001 | Fabre et al. | 73/1.57 |
| 2003/0061864 A1* | 4/2003 | Wong et al. | 73/40 |
| 2010/0071672 A1 | 3/2010 | Grunwald et al. | 123/520 |
| 2010/0101541 A1 | 4/2010 | Grunwald et al. | 123/518 |

OTHER PUBLICATIONS

International Search Report and Written Opinion for Application No. PCT/EP2009/054581 (12 pages), Aug. 18, 2009.

* cited by examiner

FIG 1

FIG 2

METHOD AND DEVICE FOR THE FUNCTIONAL TESTING OF A PRESSURE SWITCH OF A TANK VENT SYSTEM FOR AN INTERNAL COMBUSTION ENGINE OF A MOTOR VEHICLE

CROSS-REFERENCE TO RELATED APPLICATIONS

This application is a U.S. National Stage Application of International Application No. PCT/EP2009/054581 filed Apr. 17, 2009, which designates the United States of America, and claims priority to German Application No. 10 2008 023 607.1 filed May 15, 2008, the contents of which are hereby incorporated by reference in their entirety.

TECHNICAL FIELD

The invention relates to a method and a device for the functional testing of a pressure switch of a tank vent system for an internal combustion engine of a motor vehicle.

BACKGROUND

In order to adhere to increasingly stringent emission thresholds it is necessary to detect leaks reliably in a tank vent system of a motor vehicle. These checks prevent fuel vapors from escaping unnoticed into the environment.

A method for detecting a leak in a tank vent system is known from the patent specification U.S. Pat. No. 5,263,462. The method makes use of the natural formation of a vacuum inside the tank vent system. Once the tank vent system has cooled down sufficiently after the motor vehicle has been switched off, a test is conducted as to whether or not a pressure switch arranged in the tank vent system is closed. The closing of the pressure switch indicates a decrease in the pressure within the tank vent system to below a pressure value. In the case of a closed pressure switch, a leak within the tank vent system can be ruled out, because a natural vacuum could form inside the tank through cooling. On the other hand, an open pressure switch is regarded as a sign of a leak within the tank vent system. This method requires an operable pressure however. However, in the case of a defective pressure switch an incorrect diagnosis can be made and therefore testing the operability of the pressure switch is required.

SUMMARY

According to various embodiments, a method and a device for the functional testing of a pressure switch of a tank vent system can be provided.

According to an embodiment, a method for the functional testing of a pressure switch of a tank vent device for an internal combustion engine of a motor vehicle, with the pressure switch being located in a low-pressure position if the pressure in the tank vent device is lower than a pressure threshold, and said pressure switch otherwise being in a high-pressure position, may comprise—in an operating state in which a crankshaft of the internal combustion engine rotates and the pressure in an intake pipe of the internal combustion engine exceeds the pressure threshold, a tank vent valve of the tank vent device, said valve being disposed in a connecting line between a fuel vapor reservoir and the intake pipe, is actuated in such a way that the tank vent device and the intake pipe are pneumatically connected, —the pressure switch is assessed as defective if the same is in the low-pressure position after actuation of the tank vent valve.

According to a further embodiment, the operating state can be set as a result of the fact that, on detecting a locked power train of the motor vehicle and a cutoff fuel supply, a throttle valve of the internal combustion engine is at least opened to such an extent that the intake pipe pressure exceeds the pressure threshold. According to a further embodiment, the motor vehicle may be a hybrid vehicle in which the crankshaft can optionally be driven in a combustion mode by the internal combustion engine or in an electric mode by an electric motor and whereby, in order to carry out the functional testing of the pressure switch—the motor vehicle is switched over into the electric mode, and—a throttle valve of the internal combustion engine is at least opened to such an extent that the intake pipe pressure exceeds the pressure threshold. According to a further embodiment, the pressure switch may only be detected as defective when said switch is in the low-pressure position after the expiry of a given period of time since the actuation of the tank vent valve. According to a further embodiment, a measure may be carried out after the actuation of the tank vent valve which leads to a pressure drop in the tank vent device below the pressure threshold and the pressure switch is assessed as operable if it is in the low-pressure position after the carrying out of the measure. According to a further embodiment, the measure may consist in a further operating state of the internal combustion engine in which the intake pipe pressure is below the pressure threshold, the tank vent valve being actuated in such a way that the tank vent device and the intake pipe are pneumatically connected. According to a further embodiment, it may be possible that— the switching state of the pressure switch is detected before the actuation of the tank vent valve, —the tank vent valve is only actuated in the event of the pressure switch being in the low-pressure position, and—the pressure switch is assessed as operable if it is in the high-pressure position after the actuation of the tank vent valve. According to a further embodiment, the method may only be carried out up to a given limiting rotational speed of the crankshaft. According to a further embodiment, the pressure switch may only be assessed if a functional testing of the tank vent valve was carried out and this resulted in the fact that the tank vent valve is operable.

According to another embodiment, a control device for a motor vehicle may be embodied in such a way that it can carry out the method as described above.

BRIEF DESCRIPTION OF THE DRAWINGS

The invention is described in more detail below with reference to the exemplary embodiments specified in the schematic figures of the drawing, in which.

DETAILED DESCRIPTION

According to an embodiment, a method provides for the functional testing of a pressure switch of a tank vent system for an internal combustion engine of a motor vehicle. The pressure switch is designed in such a way that said switch is positioned in a low-pressure position if the pressure in the tank vent system is lower than a pressure threshold, and is otherwise in a high-pressure position. In an operating state in which a crankshaft of the internal combustion engine rotates and the pressure in an intake pipe of the internal combustion engine exceeds the pressure threshold, according to various embodiments a tank vent valve of the tank vent system, said valve being disposed in a connecting line between a fuel vapor reservoir and the intake pipe, is actuated in such a way that the tank vent system and the intake pipe are pneumatically connected to each other. The pressure switch is assessed as defective if the same is in the low-pressure position after actuation of the tank vent valve.

The method in accordance with various embodiments allows a reliable functional testing of the pressure switch even under operating states of the internal combustion engine in which the crankshaft rotates and the internal combustion engine is not at a complete standstill completely. Because of this, the method can be carried out very frequently. By detecting a defect in the pressure switch, incorrect diagnoses of the tank vent system can be prevented and the reliability of the functional testing of the tank vent system can be increased overall.

In a development of the method, the operating state is adjusted in that, on detecting a closed power train of the motor vehicle and switched-off fuel supply, a throttling member (throttle valve) of the internal combustion engine is opened at least wide enough for the intake pipe pressure to be higher than that of the pressure threshold.

The development of the method relates to the functional testing of the pressure switch in the operating state of the cutoff signal. In this process, the fuel supply is interrupted and the power train of the motor vehicle is locked (gear engaged and coupling locked). Because no combustion takes place in the combustion chambers, the crankshaft is driven only by the kinetic energy of the motor vehicle transferred through the power train and rotates. In this operating state, the throttle valve can be opened by which the intake pipe pressure increases approximately to the ambient pressure. In said state, the tank vent valve can be opened so that pressure is equalized between the tank vent system and the intake pipe. As a result of this, a pressure which lies over the pressure threshold of the pressure switch builds up in the tank vent system, as a result of which it should assume the high-pressure position. If this does not happen, there can be a defect.

In a development of the method, the motor vehicle concerned is a hybrid vehicle in which the crankshaft can optionally be driven in a combustion mode by the combustion energy of the internal combustion engine or in an electric mode by an electric motor. In order to carry out the functional testing of the pressure switch, the motor vehicle is shifted into the electric mode and a throttle valve of the internal combustion engine is opened at least wide enough for the pressure in the intake pipe to exceed the pressure threshold.

In the case of a hybrid vehicle, which has an internal combustion engine and in addition an alternate drive (electric motor), the vehicle can be driven optionally by means of the internal combustion engine or by the electric motor. In this process, the crankshaft can be connected to or separated from the electric motor by means of an appropriate coupling. In the electric mode, the crankshaft is driven exclusively by means of the electric motor and no combustion takes place in the combustion chambers. The throttle valve can be opened in said operating state, whereby the intake pipe pressure increases approximately to the ambient pressure. In this state, the tank vent valve can be opened so that a pressure equalization takes place between the tank vent system and the intake pipe. As a result of this, a pressure which lies above the pressure threshold of the pressure switch builds up in the tank vent system, whereby the latter should assume the high-pressure position. If this does not happen, there can be a defect.

In a development of the method, the pressure switch is only defective in the case when it is in the low-pressure position after a given period of time since the actuation of the tank vent valve.

The pressure between the intake pipe and the tank vent system is equalized with a time delay. Said delay is taken into account by the given period of time preventing incorrect diagnoses.

In a development of the method, a measure is taken after the actuation of the tank vent valve, which leads to a pressure drop in the tank vent system to lower than the pressure threshold. The pressure switch is considered to be operable if it is in the low-pressure position after the measure has been taken.

In a development of the method, the measure consists, in a further operating state of the internal combustion engine, in which the intake pipe pressure is lower than a pressure threshold, of the tank vent valve being actuated in such a way that the tank vent system and the intake pipe are pneumatically connected.

The throttle valve can in the case of a rotating crankshaft be closed to such an extent that a pressure which is lower than the pressure threshold builds up in the intake pipe. The tank vent valve is opened in said state, which causes a pressure equalization between the intake pipe and the tank vent system, and the pressure switch assumes the low-pressure position. Should this not be the case, the pressure switch could be defective. Because of this, it can be determined whether or not the pressure switch is stuck in the high-pressure position.

In a development of the method, the switching state of the pressure switch is established before the actuation of the tank vent valve. The tank vent valve is only actuated then when the pressure switch is in the low-pressure position. The pressure switch is considered to be operable if it is in the high-pressure position after the actuation of the tank vent valve.

Only when the pressure switch is found to have been switched over from the low-pressure position to the high-pressure position can it be ensured that the pressure switch is operable. Otherwise the pressure switch could become stuck in the high-pressure position already before the actuation of the tank vent valve. Because of this development, incorrect diagnoses can be prevented.

In a development of the method, said method is carried out only up to a given limiting rotational speed of the crankshaft.

An intake pipe pressure which lies above the pressure threshold of the pressure switch, can because of the suction effect of the cylinder be adjusted only up to a certain rotational speed.

Owing to this development, the process safety of the method can be improved and incorrect diagnoses can be prevented.

In a development of the method, the pressure switch is only evaluated then when a functional testing of the tank vent valve was carried out previously and this revealed that the tank vent valve is operable.

The execution of the method requires an intact tank vent valve. Therefore, in order to guarantee the reliability of the method, the tank vent valve is tested beforehand.

A control device for a motor vehicle according to an embodiment is embodied in such a way that said control device can carry out the method as described above. With regard to the advantages resulting from this, reference is made to the embodiments of the method.

Figure 1:
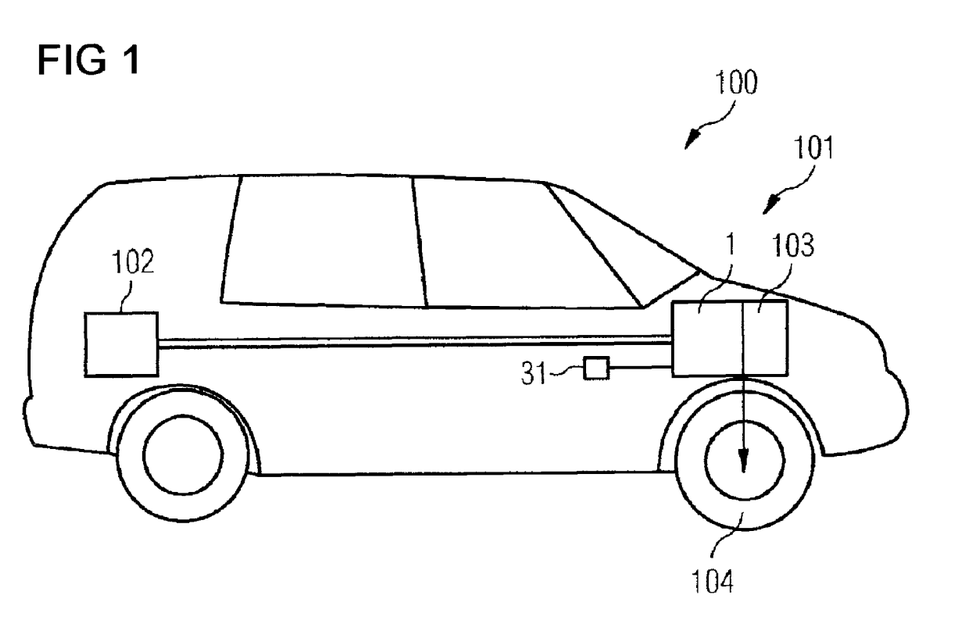
FIG. 1 shows a schematic diagram of a motor vehicle.

FIG. 1 is a schematic diagram of a motor vehicle 100, which is embodied as a hybrid vehicle and has a hybrid drive 101. The hybrid drive 101 is connected to driving gears 104 and includes an internal combustion engine 1 and an electric motor 103. The motor vehicle 100 can optionally be driven in the electric mode by means of the electric motor 103 or in a combustion mode by means of the internal combustion engine 1. The switching over between the electric mode and the combustion mode takes place independently from the driver of a motor vehicle (not shown) by means of a control device 31 of the motor vehicle 100. In addition, the motor vehicle 100 has a tank vent device 102, which is connected to the internal combustion engine 1 and to the control device 31. Reference is made to the fact that the invention is not limited to the embodiment of the motor vehicle 100 as a hybrid vehicle. The invention can be applied in the same way to a motor vehicle 100 with only an internal combustion engine.

Figure 2:
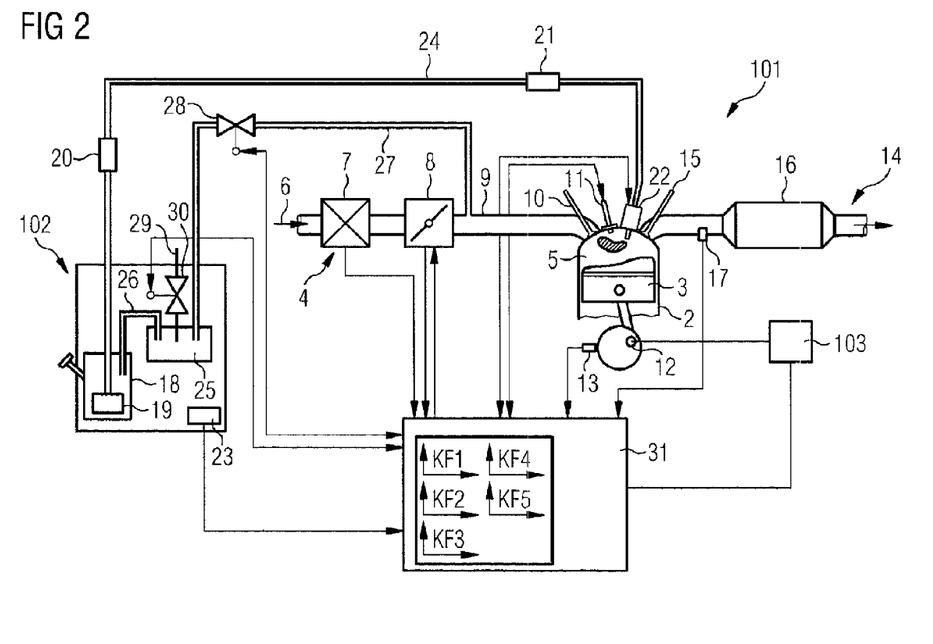
FIG. 2 shows a schematic diagram of an internal combustion engine with a tank vent device.

FIG. 2 is a schematic diagram of the internal combustion engine 101, the electric motor 103 and the tank vent device 102.

The internal combustion engine 101 has at least one cylinder 2 and a piston 3 moving up and down in the cylinder 2. The fresh air needed for combustion is led into a combustion chamber 5 limited by the cylinder 2 and the piston 3 via a suction tract 4. Downstream of a suction opening 6 in the suction tract 4, there are a mass air flow sensor 7 to detect the air throughput in the suction tract 4, a throttle valve 8 to control the air throughput, an intake pipe 9 and an inlet valve 10 by means of which the combustion chamber 5 is optionally connected to or separated from the suction tract 4.

The combustion is initiated by means of a spark plug 11. The driving energy produced by the combustion is transferred via a crankshaft 12 to the power train of the motor vehicle (not shown). A rotational speed sensor 13 records the rotational speed of the internal combustion engine 1.

The combustion exhaust gases are drawn off via an exhaust gas tract 14 of the internal combustion engine 1. The combustion chamber 5 is optionally connected to or separated from the said exhaust gas tract 14 by means of an exhaust valve 15. The exhaust gases are cleaned in an exhaust gas cleaning catalytic converter 16. Furthermore, in the exhaust gas tract 14 there is a so-called lambda sensor 17 for measuring the oxygen content in the exhaust gas.

Furthermore, the internal combustion engine 1 includes a fuel supply device with a fuel pump 19, a high-pressure pump 20, a pressure reservoir 21 and at least one injection valve 22 that can be controlled. The fuel is conveyed by means of a fuel pump 19 from a fuel tank 18 in a fuel supply line 24. The high-pressure pump 20 and the pressure reservoir 21 are arranged in the fuel supply line 24. The high-pressure pump 20 has the task of supplying fuel to the pressure reservoir 21 under high pressure. In this process, the pressure reservoir 21 is embodied as a common pressure reservoir 21 for all the injection valves 22. It supplies all the injection valves 22 with pressurized fuel. In the exemplary embodiment it involves an internal combustion engine 1 with direct fuel injection, in which the fuel is injected directly into the combustion chamber 5 by means of the injection valve 22, which projects into the combustion chamber 5. It must however be pointed out that the present invention is not limited to this kind of fuel injection, but can also be used for other kinds of fuel injection, such as for example the intake pipe injection.

Furthermore, the tank vent device 102 is allocated to the internal combustion engine 1. The fuel tank 18 and a fuel vapor reservoir 25, said reservoir, which is for example embodied as an active carbon container and is connected through a connecting line 26 to the fuel tank 18 belongs to the tank vent device 102. The fuel vapors arising in the fuel tank 18 are led into the fuel vapor reservoir 25 and are adsorbed there by the active carbon. The fuel vapor reservoir 25 is connected via a vent line 27 to the intake pipe 9 of the internal combustion engine 1. In the vent line 27 there is a tank vent valve 28 that can be controlled. Furthermore, fresh air can be fed into the fuel vapor reservoir 25 via a ventilation line 29 and a ventilation valve 30 arranged therein. The ventilation valve 30 can for example be operated electrically (as in the exemplary embodiment) or by means of a suitable pneumatic-mechanical mechanism. In addition, the tank vent device 102 includes a pressure switch 23, which can take in two switching positions—a low-pressure position or a high-pressure position. The pressure switch 23 is in a low-pressure position when the pressure in the tank vent device 102 is below a pressure threshold. Otherwise, the pressure switch 23 is in the high-pressure position. In certain operating areas of the internal combustion engine 1, in particular during idling or in the case of a partial load, a large pressure drop prevails between the environment and the intake pipe 9 because of the strong throttle effect by means of the throttle valve 8. By opening the tank vent valve 28 and the ventilation valve 30, a rinsing effect is created during a tank vent period in which the fuel vapors stored in the fuel vapor reservoir 25 are led into the intake pipe 9 and participate in the combustion. In this way, the fuel vapors cause a change in the composition of the combustion gases and the exhaust gases, which are detected by the lambda sensor 17.

The electric motor 103 can be connected via a suitable coupling (not shown) to the crankshaft 12 of the internal combustion engine 1 so that the motor vehicle 100 or the crankshaft 12 can be driven optionally by the electric motor 103 (electric mode) or by means of the combustion energy of the internal combustion engine 1 (combustion mode). Both in the electric mode and in the combustion mode, the power is transmitted via the crankshaft 12, so that it rotates.

In the control device 31, performance-based engine control functions (KF1 to KF5) are implemented by using software. The control device 31 is connected to all the actuators and the sensors of the internal combustion engine 1 via signal lines and data lines. In particular, the control device 31 is connected to the ventilation valve 30 that can be controlled, the tank vent valve 28 that can be controlled, the pressure switch 23, the mass air flow sensor 7, the throttle valve 8 that can be controlled, the injection valve 22 that can be controlled, the spark plug 11, the lambda sensor 17, the rotational speed sensor 13 and the electric motor 103. The control device 31 also takes over the coordination of the operation of the motor vehicle in the electric mode and in the combustion mode.

Figure 3A:
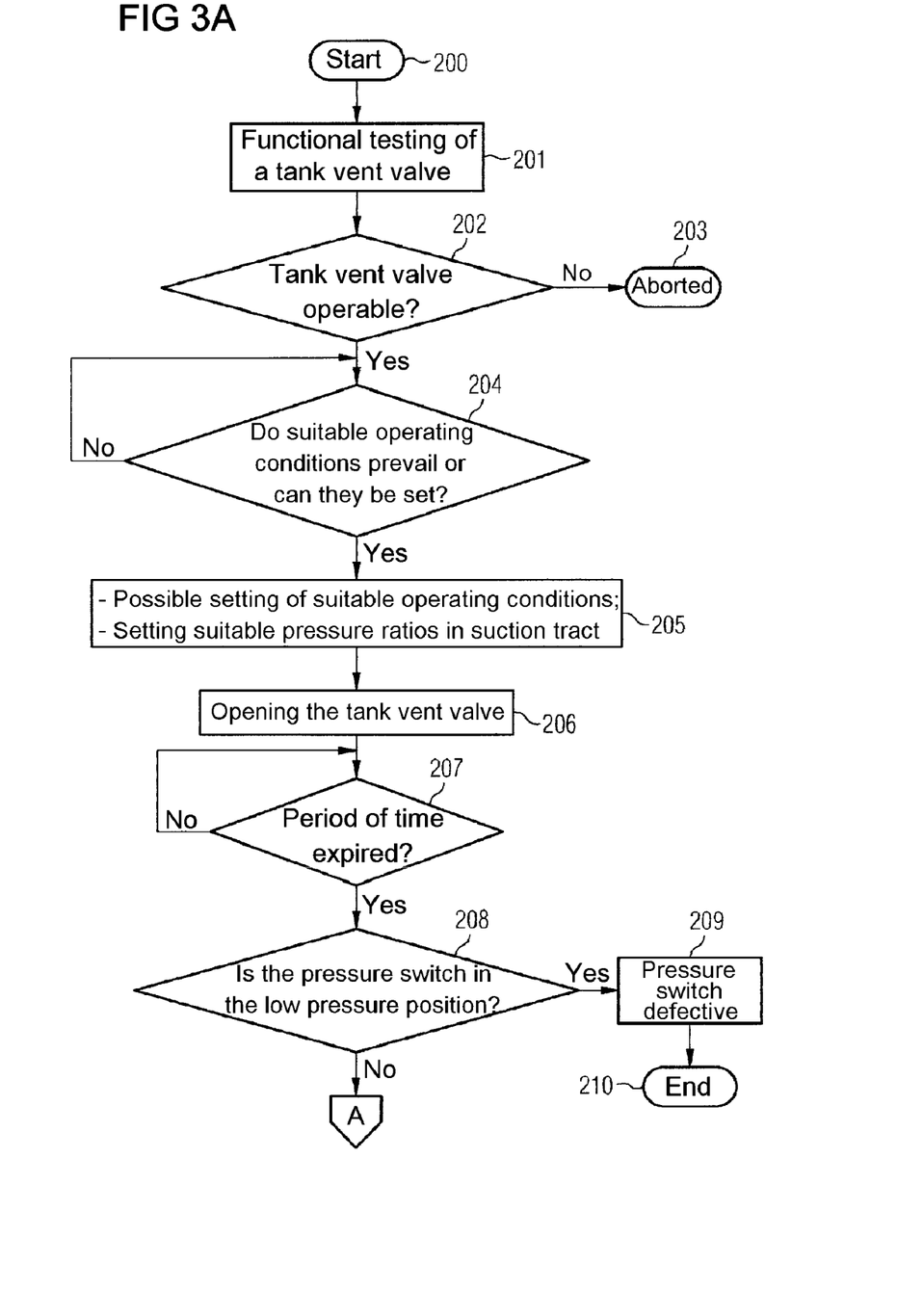
FIGS. 3A, 3B show a control method in the form of a flowchart.
Figure 3B:
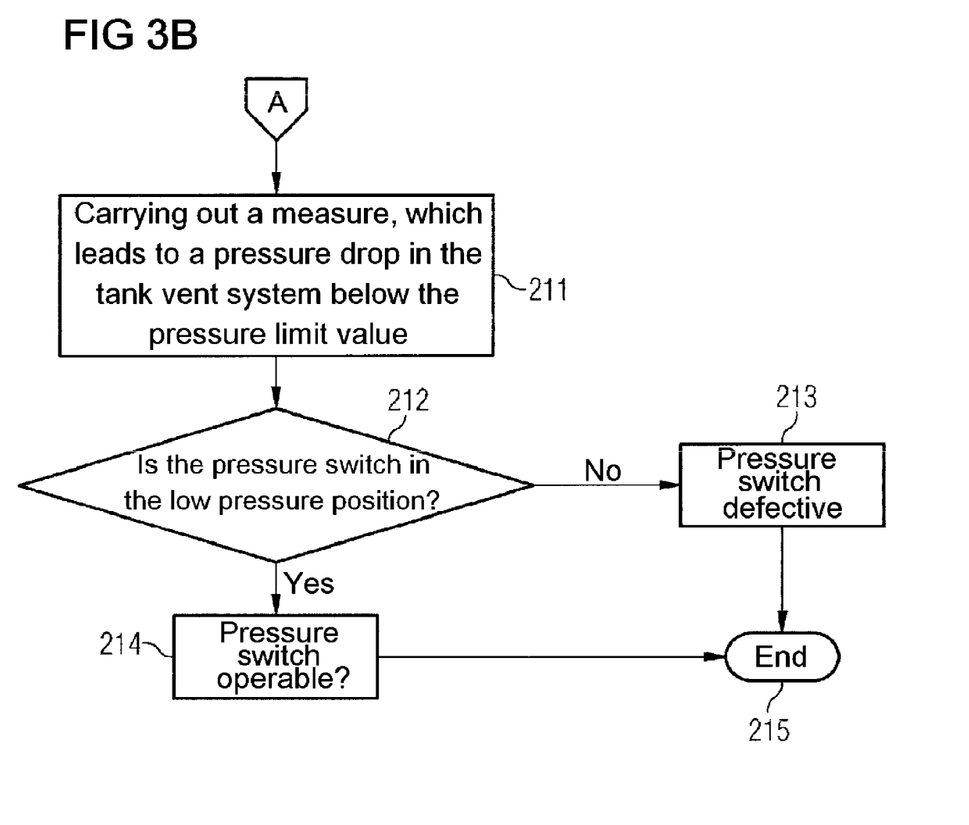

FIGS. 3A and 3B show an exemplary embodiment of a method for testing the pressure switch 23 in the form of a flowchart.

The method is started in a step 200, on starting the internal combustion engine 1 for example. It is assumed that the motor vehicle 100 is initially operated in combustion mode.

First of all, in a step 201, a functional testing of the tank vent valve 28 is carried out. This is for example possible as a result of the fact that the tank vent valve 28 is opened during the operation of the internal combustion engine 2 and the fuel vapor reservoir 24 is pneumatically connected to the intake pipe 9 of the internal combustion engine 2. Furthermore, the ventilation valve 30 is also opened so that fresh air can enter into the fuel vapor reservoir 24. By means of the negative pressure in the intake pipe 9, a rinsing effect is achieved whereby the fuel vapors adsorbed in the fuel vapor reservoir 25 by the negative pressure prevailing in the intake pipe 9 are released and at the same time fresh air flows in through the ventilation valve 30 into the fuel vapor reservoir 24. The fuel vapors supplied to the intake pipe 9 are supplied via the inlet valve 10 to the combustion chamber 5 of the internal combustion engine 1 and take part in the combustion. In the case of an operable tank vent valve 28 the resulting change if the fuel mix composition becomes evident in the exhaust gas composition, which is detected by the lambda sensor 17. Should, following the opening of the tank vent valve 28, a change in the exhaust gas composition be detected by the lambda sensor 17 or by a lambda controller implemented in the control device 31, the tank vent valve 28 can be evaluated as operable. Should, even after the actuation of the tank vent valve 28, no change be found in the exhaust gas composition, it can be concluded that the tank vent valve 28 is defective.

In a step 202 it is tested whether or not the tank vent valve 28 is operable. If the test yields a negative result, the method in a step 203 is aborted because the testing of the pressure switch 23 cannot be carried out in a meaningful manner in the case of a defective tank vent valve 28. Should the tank vent valve 28 in a step 202 be found to be functioning correctly, the method continues in a step 204.

In a step 204 a test is carried out in order to determine whether or not suitable operating conditions prevail for the functional testing of the pressure switch 23 or whether or not these can be an alternative. Suitable operating conditions prevail then when the motor vehicle 100 is operated in the combustion mode and is in the operating state of the cutoff signal. In this process, a (not shown) power train of the motor vehicle 100 is locked (gear engaged and coupling locked) so that power is transmitted from the crankshaft of the internal combustion engine to the driving gears 104 and the fuel injection is cut off so that no combustion takes place in the combustion chambers 5. In this operating state, the crankshaft 12 is only driven by the kinetic energy of the motor vehicle 100 and thus rotates. Said operating state often occurs on driving downhill or in other driving situations in which the friction-determined braking effect of the internal combustion engine 1 should be used.

Furthermore, there are suitable operating conditions when the motor vehicle 100 is operated in the electric mode. In this process, the fuel supply of the internal combustion engine 1 is deactivated and no combustion takes place in the combustion chambers 5 of the internal combustion engine 1. The crankshaft 12 of the internal combustion engine 1 is only driven by the electric motor 103.

Generally speaking, suitable operating conditions prevail when the crankshaft rotates but is not driven by the combustion energy of the internal combustion engine 1, i.e. when no combustion takes place in the combustion chambers 5. As will become clear in the further embodiments, the reason can be seen in that, in the case of these operating conditions, the position of the throttle valve 8 can be changed without it having any effect on the torque produced by the internal combustion engine 1 and is therefore not noticed by the driver.

Furthermore, a test is carried out in a step 204 in order to determine whether or not the operating conditions are suitable. This is for example the case then when the motor vehicle 100 is indeed operated in the combustion mode, but the required torque was also made available by the electric motor 103 in order to drive the motor vehicle 100. In this case, a switching over from the combustion mode to the electric mode would be possible without there being a loss of comfort for the driver of the motor vehicle.

In the case of a negative result of the test in a step 204, said test is repeated.

In the case of a positive result of the test in a step 204, the method continues in a step 205. Should it be found in a step 204 that indeed no suitable operating conditions prevail, but may be adjusted, this is done next. For this purpose, it is for example necessary to switch over from the combustion mode to the electric mode when this can take place without there being a loss of comfort for the driver of the vehicle.

Should suitable operating conditions already prevail (operation of the motor vehicle in the electric mode or the cutoff signal in the combustion mode) or should suitable operating conditions have been set, the throttle valve 8 is activated in such a way that suitable pressure ratios are set in the suction tract 4 or in the intake pipe 9 for the functional testing of the pressure switch 23. To this end, the throttle valve 8 is opened to such an extent that a pressure is set in the intake pipe 9, which lies above the pressure threshold of the pressure switch 23. The throttle valve 8 is opened fully in an advantageous manner so that approximately an environmental pressure is set in the intake pipe 9, which lies above the pressure threshold of the pressure switch 23. Because the motor vehicle 100 or the crankshaft 12 is not driven by the combustion energy (fuel supply cut off), the opening of the throttle valve 8 has no influence on the torque.

Once suitable operating conditions prevail, the tank vent valve is opened in a step 206. In that way, the tank vent device 102 is pneumatically connected to the intake pipe 9 and the pressure between the tank vent device 102 and the intake pipe 9 is equalized.

However, the complete pressure equalization requires a certain time, for which reason, in a step 207 a test is carried out in order to determine whether or not a given period of time has expired since the opening of the tank vent valve 2. Should this not be the case, the test is repeated. Otherwise, the method continues in a step 208.

Because of the pressure equalization, pressure ratios which lie above the pressure threshold of the pressure switch 23 are also set in the tank vent device 102. That is why a test is carried out in a step 208 in order to determine whether or not the pressure switch 23 is in the low-pressure position. Should this be the case, then the pressure switch 23 is assessed as defective in a step 209 and the method is ended in a step 210.

Should it be detected in a step 208 that the pressure switch 23 is in the high-pressure position, the method continues with a step 211 in which a measure is carried out, which leads to a pressure drop in the tank vent device 102 below the pressure threshold. This can for example take place by means of the fact that the throttle valve 8, in the case of a rotating crankshaft (suction effect), is again closed to such an extent that a pressure is set in the intake pipe 9, which lies below the pressure threshold of the pressure switch 23. By means of the opened tank vent valve 28 a pressure which is lower than the pressure threshold is also set in the tank vent device 102. Under these conditions, an operable pressure switch switches to the low-pressure position.

After a certain time, in a step 212, a test is carried out in order to determine whether or not the pressure switch 23 is in the low-pressure position. Should this not be the case, the pressure switch 23 is assessed as defective in a step 213 (stuck in the high-pressure position). On the other hand, should it be detected that the pressure switch 23 is in the low-pressure position then the pressure switch in a step 214 is assessed as operable. In both cases, the method is ended in a step 215.

Reference is made to the fact that at the beginning of the method, for example immediately before a step 201 or immediately after a step 202, said method is only continued under the condition if the rotational speed of the crankshaft 12 is lower then a given limiting rotational speed. This is linked to the fact that because of the suction effect of the pistons 3 in the case of too high rotational speeds in the intake pipe 9, a pressure, which is above the pressure threshold, can no longer be set. The method should thus be aborted if the rotational speed of the crankshaft 12 exceeds the limiting rotational speed.

Reference is furthermore made to the fact that the method steps 211 to 215 are also carried out in the combustion mode it being possible that an operating point must be selected here in which the intake pipe pressure lies below the pressure threshold.

Reference is furthermore made to the fact that the pressure switch 23 can also in the case of a positive result of the test in a step 205 (pressure switch in the high-pressure position) be assessed as being operable if before opening the tank vent valve in a step 206 it was detected that the pressure switch 23 was in the low-pressure position.

What is claimed is:

1. A method for the functional testing of a pressure switch of a tank vent device for an internal combustion engine of a motor vehicle, with the pressure switch being located in a low-pressure position if the pressure in the tank vent device is lower than a pressure threshold, and said pressure switch otherwise being in a high-pressure position, the method comprising:
   in an operating state in which a crankshaft of the internal combustion engine rotates and the pressure in an intake pipe of the internal combustion engine exceeds the pressure threshold, actuating a tank vent valve of the tank vent device, said valve being disposed in a connecting line between a fuel vapor reservoir and the intake pipe, in such a way that the tank vent device and the intake pipe are pneumatically connected,
   assessing the pressure switch as defective if the pressure switch is in the low-pressure position after actuation of the tank vent valve.

2. The method according to claim 1, wherein the operating state being set as a result of the fact that, on detecting a locked power train of the motor vehicle and a cutoff fuel supply, a throttle valve of the internal combustion engine is at least opened to such an extent that the intake pipe pressure exceeds the pressure threshold.

3. The method according to claim 1, wherein the motor vehicle being a hybrid vehicle in which the crankshaft can optionally be driven in a combustion mode by the internal combustion engine or in an electric mode by an electric motor and whereby, in order to carry out the functional testing of the pressure switch
   the motor vehicle is switched over into the electric mode, and
   throttle valve of the internal combustion engine is at least opened to such an extent that the intake pipe pressure exceeds the pressure threshold.

4. The method according to claim 1, wherein the pressure switch only being detected as defective when said switch is in the low-pressure position after the expiry of a given period of time since the actuation of the tank vent valve.

5. The method according to claim 1, further comprising assessing the pressure switch as operable if it is in the low-pressure position after an additional action taking place after the actuation of the tank vent valve, wherein the additional action leads to a pressure drop in the tank vent device below the pressure threshold.

6. The method according to claim 5, wherein the additional action results in a further operating state of the internal combustion engine in which the intake pipe pressure is below the pressure threshold, the tank vent valve being actuated in such a way that the tank vent device and the intake pipe are pneumatically connected.

7. The method according to claim 1, further comprising:
   detecting the switching state of the pressure switch before the actuation of the tank vent valve,
   only actuating the tank vent valve if the pressure switch is in the low-pressure position, and
   assessing the pressure switch as operable if the pressure switch is in the high-pressure position after the actuation of the tank vent valve.

8. The method according to claim 1, wherein the method only being carried out up to a given limiting rotational speed of the crankshaft.

9. The method according to claim 1, wherein the pressure switch only being assessed if a functional testing of the tank vent valve was carried out and this resulted in the fact that the tank vent valve is operable.

10. A control device for a motor vehicle, the control device being coupled with a pressure switch of a tank vent device for an internal combustion engine of a motor vehicle, with the pressure switch being located in a low-pressure position if the pressure in the tank vent device is lower than a pressure threshold, and said pressure switch otherwise being in a high-pressure position, wherein the control device is operable:
    in an operating state in which a crankshaft of the internal combustion engine rotates and the pressure in an intake pipe of the internal combustion engine exceeds the pressure threshold, to actuate a tank vent valve of the tank vent device, said valve being disposed in a connecting line between a fuel vapor reservoir and the intake pipe, in such a way that the tank vent device and the intake pipe are pneumatically connected, and
    to assess the pressure switch as defective if the pressure switch is in the low-pressure position after actuation of the tank vent valve.

11. The control device according to claim 10, wherein the control device is further operable to set the operating state as a result of the fact that, on detecting a locked power train of the motor vehicle and a cutoff fuel supply, a throttle valve of the internal combustion engine is at least opened to such an extent that the intake pipe pressure exceeds the pressure threshold.

12. The control device according to claim 10, wherein the motor vehicle being a hybrid vehicle in which the crankshaft can optionally be driven in a combustion mode by the internal combustion engine or in an electric mode by an electric motor and whereby, in order to carry out the functional testing of the pressure switch
    the motor vehicle is switched over into the electric mode, and
    a throttle valve of the internal combustion engine is at least opened to such an extent that the intake pipe pressure exceeds the pressure threshold.

13. The control device according to claim 10, wherein the control device is further operable to detect the pressure switch only as defective when said switch is in the low-pressure position after the expiry of a given period of time since the actuation of the tank vent valve.

14. The control device according to claim 10, wherein the control device is further operable to carry out an additional action after the actuation of the tank vent valve, wherein the additional action leads to a pressure drop in the tank vent device below the pressure threshold, and to assess the pressure switch is assessed as operable if it is in the low-pressure position after the additional action takes place.

15. The control device according to claim 14, wherein the additional action results in a further operating state of the internal combustion engine in which the intake pipe pressure is below the pressure threshold, the tank vent valve being actuated in such a way that the tank vent device and the intake pipe are pneumatically connected.

16. The control device according to claim 10, further comprising the control device operable to:
- detect the switching state of the pressure switch before the actuation of the tank vent valve,
- only actuate the tank vent valve if the pressure switch is in the low-pressure position, and
- assessing the pressure switch as operable if it is in the high-pressure position after the actuation of the tank vent valve.

17. The control device according to claim 10, wherein the control device is further operable to the assessment only being carried out up to a given limiting rotational speed of the crankshaft.

18. The control device according to claim 10, wherein the control device is further operable to assess the pressure switch only if a functional testing of the tank vent valve was carried out and this resulted in the fact that the tank vent valve is operable.

19. A motor vehicle, comprising a control device being coupled with a pressure switch of a tank vent device for an internal combustion engine of the motor vehicle, with the pressure switch being located in a low-pressure position if the pressure in the tank vent device is lower than a pressure threshold, and said pressure switch otherwise being in a high-pressure position, wherein the control device is operable:
- in an operating state in which a crankshaft of the internal combustion engine rotates and the pressure in an intake pipe of the internal combustion engine exceeds the pressure threshold, to actuate a tank vent valve of the tank vent device, said valve being disposed in a connecting line between a fuel vapor reservoir and the intake pipe, in such a way that the tank vent device and the intake pipe are pneumatically connected, and
- to assess the pressure switch as defective if the pressure switch is in the low-pressure position after actuation of the tank vent valve.

20. The motor vehicle according to claim 19, wherein the motor vehicle is a hybrid vehicle in which the crankshaft can optionally be driven in a combustion mode by the internal combustion engine or in an electric mode by an electric motor and whereby, in order to carry out the functional testing of the pressure switch
- the motor vehicle is switched over into the electric mode, and
- a throttle valve of the internal combustion engine is at least opened to such an extent that the intake pipe pressure exceeds the pressure threshold.

* * * * *